US008301692B1

(12) United States Patent
Hamaker et al.

(10) Patent No.: US 8,301,692 B1
(45) Date of Patent: Oct. 30, 2012

(54) PERSON TO PERSON SIMILARITIES BASED ON MEDIA EXPERIENCES

(75) Inventors: Janna Hamaker, Issaquah, WA (US); Eugene Kalenkovich, Sammamish, WA (US); Zaur Kambarov, Seattle, WA (US); Tom Killalea, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 142 days.

(21) Appl. No.: 12/485,700

(22) Filed: Jun. 16, 2009

(51) Int. Cl.
*G06F 15/16* (2006.01)

(52) U.S. Cl. .................. 709/203; 705/26.7; 705/7.29

(58) Field of Classification Search .................. None
See application file for complete search history.

(56) References Cited

U.S. PATENT DOCUMENTS

| 6,430,539 | B1* | 8/2002 | Lazarus et al. ............... 705/7.31 |
| 6,963,850 | B1* | 11/2005 | Bezos et al. .................. 705/7.29 |
| 2002/0004735 | A1* | 1/2002 | Gross .............................. 705/10 |
| 2005/0159996 | A1* | 7/2005 | Lazarus et al. .................. 705/10 |
| 2006/0020662 | A1* | 1/2006 | Robinson ....................... 709/203 |
| 2007/0106656 | A1* | 5/2007 | Gutta ................................ 707/5 |
| 2009/0006290 | A1* | 1/2009 | Gunawardana et al. ........ 706/14 |
| 2009/0177654 | A1* | 7/2009 | Beaupre et al. ................... 707/5 |
| 2009/0222329 | A1* | 9/2009 | Ramer et al. ..................... 705/10 |
| 2010/0293048 | A1* | 11/2010 | Singolda et al. ........... 705/14.43 |

OTHER PUBLICATIONS

The Netflix Blog, "A Guide to Similarity %", retrieved from the internet at http://blog.netflix.com/2007/06/guide-to-similarity.html.
Toscher, et al., "Recommender Systems and the Netflix Prize", Feb. 18, 2009, San Francisco, retrieved from the internet at http://www.commendo.at/references/files/paw09_presentation.pdf.
Wang, et al., "Unifying User-based and Item-based Collaborative Filtering Approaches by Similarity Fusion", Proceedings from the 2006 SIGIR Conference, Aug. 6-11, 2006, Seattle, WA.
Xue, et al., "Scalable Collaborative Filtering Using Cluster-based Smoothing", Proceedings of the 2005 SIGIR Conference, Salvador, Brazil, pp. 114-121.

* cited by examiner

*Primary Examiner* — Ario Etienne
*Assistant Examiner* — Clayton R Williams
(74) *Attorney, Agent, or Firm* — Lee & Hayes, PLLC

(57) ABSTRACT

Similarities are discovered among different users with respect to their media experiences and other behaviors, such as taste in media items (e.g., books, music, movies, magazines, art, etc.), browsing behavior, purchase decisions, and online shopping habits, and usage history. The similarities are determined in part by substantially real-time comparison of individual users with a set of predetermined user-based clusters formed from the experiences and behaviors of sample users. Users from a population may then be identified based on similarity metrics. Recommendations for new media items, or other goods/services, may also be made based on choices being made by similar users.

33 Claims, 10 Drawing Sheets

PERSON TO PERSON SIMILARITIES BASED ON MEDIA EXPERIENCES

BACKGROUND

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistant (PDA), portable media players, tablet computers, netbooks, and the like. As the quantity of available electronic media content continues to grow, identifying portions of the electronic media content considered relevant to individual users and communities of users has become more desirable.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes an architecture and techniques in which similarities are discovered among different people with respect to their media experiences and other behaviors, such as taste in media items (e.g., books, music, movies, magazines, art, etc.), browsing behavior, purchase decisions, online shopping habits, and usage history. The similarities are determined in part by substantially real-time comparison of individual users with a set of predetermined user-based clusters formed from the experiences and behaviors of sample users (fictitious or real humans). When two different users are found to compare similarly to the user-based clusters, the two users are said to be similar. Conversely, two users are dissimilar when they do not compare similarly to the user-based clusters. The information can be provided to a user to reveal other people who are similar and/or dissimilar. From this information, the user may choose to follow future media selections made by a similar person. Alternatively, the user may want a change of pace and decide to see what media items are being experienced by dissimilar people. Furthermore, recommendations may be offered to the user according to choices made by other people who are identified as being similar.

For discussion purposes, the architecture and techniques are described in the context identifying other users who experience similar media items, such as readers of the same book or listeners of the same music. However, the concepts described herein are also applicable to other media experiences, as well as many other user behaviors from which similarities may be determined.

Architectural Environment

Figure 1:
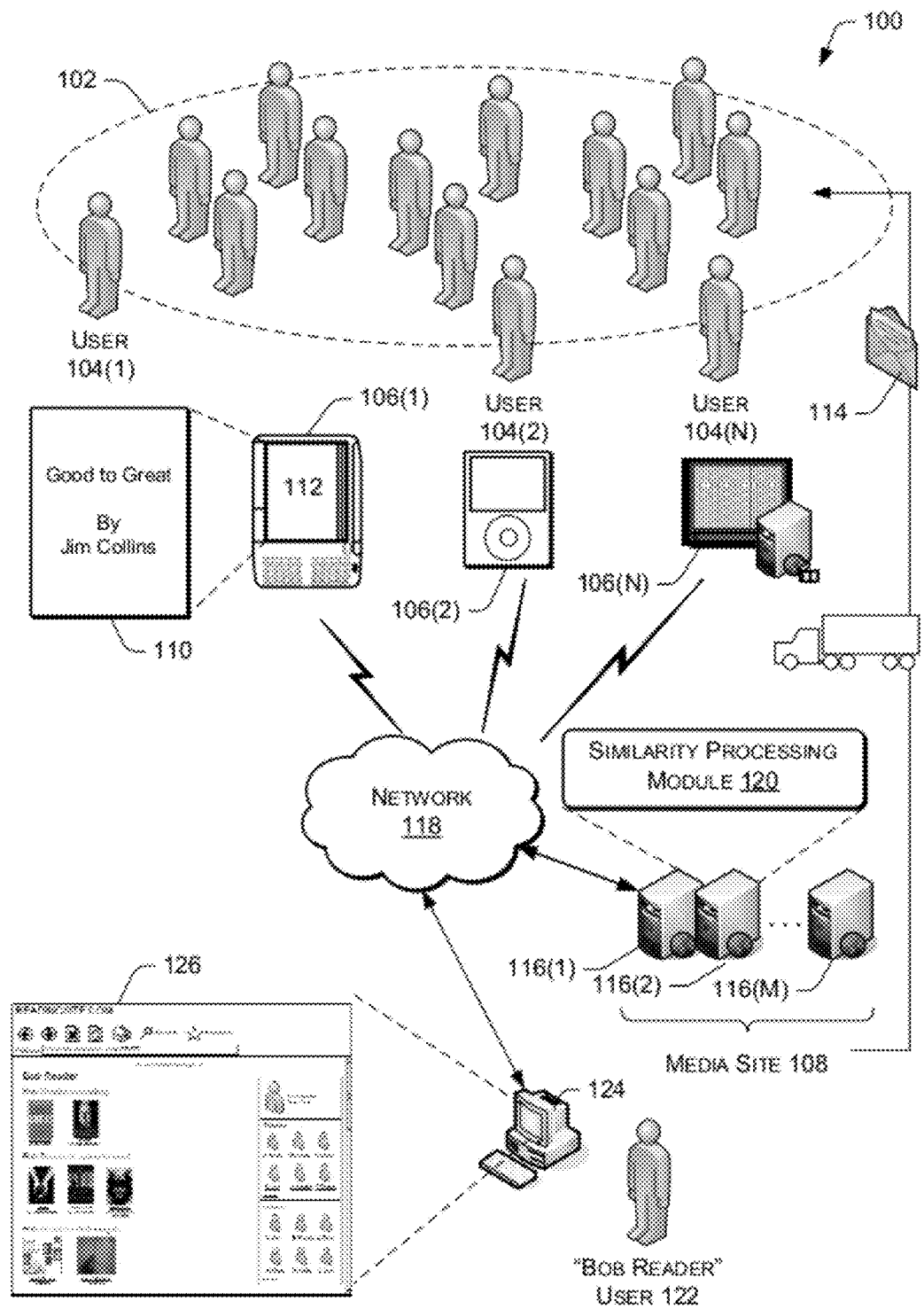
FIG. 1 illustrates an architecture in which similarities are discovered among a population of users with respect to their media experiences (e.g., taste in books, music, movies, etc.) as well as other behaviors (e.g., browsing characteristics, purchase decisions, and so forth). Once discovered, these similarities can then be employed by a user to identify other people with similar interests and thereby add a richer, more social context to media experiences.

FIG. 1 illustrates an example architecture 100 in which users with similar media experiences and other behaviors may be identified. The users are part of a population of people, generally referenced as 102, and they experience many various forms of media and exhibit many different and diverse behaviors. The user population 102 may be a defined group of users (e.g., a club or group that involves registration or subscription) or an open ended collection of users (e.g., everyone visiting a media site). The user population 102 is large and includes many individual users, as represented by individual users 104(1), 104(2), ..., 104(N). Since the population 102 is expected to be quite large, the users are unlikely to know one another. Hence, the architecture 100 attempts to discover similarities among the various users and make similar users known to one another in order to provide a richer, more social environment for community enjoyment of media experiences.

Each representative user 104(1)-(N) employs one or more corresponding electronic devices 106(1), 106(2) ..., 106(N) to enable consumption of a media item, and thereby provide a media experience. For instance, the user 104(1) is reading an electronic book with her electronic book ("eBook") reader device 106(1), while user 104(2) is listening to music on his personal media device 106(2). The user 104(N) is watching a movie (e.g., DVD, streaming, etc.) on her entertainment system 106(N). While these example devices are shown for purposes of illustration and discussion, it is noted that many other electronic devices may be used, such as laptop computers, cellular telephones, portable media players, tablet computers, netbooks, notebooks, desktop computers, gaming consoles, DVD players, media centers, and the like.

The media being consumed by the user population 102 may be media items retrieved electronically from a remote source, as represented by media site 108. The media site 108 is representative of any number of sites or entertainment sources that provide media items to the users. The media items may be free or available for purchase. The media items may be any type or format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. For instance, in FIG. 1, the user 104(1) is reading an eBook version 110 of Jim Collins' book titled, Good to Great, which was purchased and downloaded from the media site 108. The eBook 110 is displayed on a screen 112 of the eBook reader device 106(1). Similarly, the user 104(2) is able to download music from the site 108 and play it on the personal media device 106(2), while the user 104(N) is able to download videos from the site 108 and play it on the entertainment system 106(N).

However, in some implementations, the media site 106 may be a site that allows purchase of certain forms of non-downloaded media items that are then delivered via an offline delivery mechanism, such as through the mail or a courier service. For instance, a user may rent or purchase a DVD or VHS movie from the site 108, and that movie is subsequently delivered through the mail. Moreover, not all media items are digital. For instance, a user 104 may elect to browse the media site 108 to purchase a subscription to a magazine, which is mailed periodically, or to buy a physical hardback book that is later delivered via the mail. As shown in FIG. 1, any form of non-digital, non-downloadable item 114 may be delivered to one or more users in the population 102 via an offline delivery mechanism (as represented graphically by a delivery truck).

The media site 108 is illustrated as being hosted on servers 116(1), 116(2), . . . , 116(M), which collectively have processing and storage capabilities to receive requests for media items and to facilitate purchase and/or delivery of those items to the various client devices 106(1)-(N). In some implementations, the servers 116(1)-(M) store the digital media items, although in other implementations, the servers merely facilitate purchase and delivery of those items. The servers 116(1)-(M) may be embodied in any number of ways, including as a single server, a cluster of servers, a server farm or data center, and so forth, although other server architectures (e.g., mainframe) may also be used.

The users 104(1)-(N) employ the client devices 106(1)-(N) to access the site 108 via a network 118. The network 118 is representative of any one or combination of multiple different types of networks, such as the Internet, cable networks, cellular networks, wireless networks, and wired networks.

A similarity processing module 120 resides at the media site 108, executing on the servers 116(1)-(M). The similarity processing module 120 evaluates individual users 104 in the population 102 to identify other people who have similar media experiences. Generally, the similarity processing module 120 forms multiple user-based clusters of media items that individual sample users have experienced. That is, the collection of media items (books, magazines, movies, music, etc.) experienced by each sample user effectively defines the user-based cluster for that sample user. The cluster formation may be performed in advance to provide a framework within which to measure similarities among the users.

The similarity processing module 120 then computationally derives a media experience similarity metric between any two non-sample users 104 in the population in substantially real-time. The computation is made in part by evaluating how sets of media items experienced by each of the non-sample users compares to those in the user-based clusters. This metric allows the site 108 to identify users who have, for example, read similar books, or listened to similar music, or viewed similar movies. In one specialized case, the similarity processing module 120 is used to compute similarities between readers with respect to the books they have engaged with by reading all or part of the book, highlighting the book, annotating the book, specifying an intention to read the book, or retrieving and/or reading a sample portion of the book. Further, the same techniques may be extended to identify similarities between two non-sample users with respect to online shopping purchase decisions, browsing behavior, and usage history. The similarity processing module 120 is described below in more detail with reference to FIG. 2.

By identifying other people with similar media experiences, the media site 108 allows individual users to discover what other people with similar interests are currently experiencing. For instance, suppose another user 122 (who may also be part of the user population 102) employs a client device 124 to access the media site 108. The client device 124 may be implemented as any number of computing devices (mobile or stationary) that can access the servers 116(1)-(M) via the network 118, including, for example, a personal computer, a laptop computer, PDA, a cell phone, a set-top box, a game console, and so forth. The client device 124 is equipped with one or more processors and memory to store applications and data. The client device 124 executes an application (e.g., browser, reader application, etc.) that requests and renders content served by the media site 108, such as a media experience page 126.

The media experience page 126 is customized for the user 122, who for discussion purposes will be referred to as "Bob Reader." The media experience page 126 allows Bob Reader (i.e., user 122) to enter media items of interest, such as items that he is currently experiencing (e.g., books he's reading, music he's listening to, movies he's watching, etc.) and those that Bob intends to experience in the future. Additionally, the media experience page 126 provides information to Bob Reader 122 about which other users 104 in the population 102 have similar (or dissimilar) media experiences based on the media items they have consumed in the past as measured by the media experience similarity metric computed by the similarity processing module 120. In this manner, the media site 108 provides Bob Reader 122 with identities of others with similar interests as manifest by those others having read many of the same books, or listened to many of the same songs, or watched many of the same movies, or exhibited many of the same behaviors. It is noted that the media site 108 may not actually provide the true identities of others (unless given express permission), but essentially identifies other users in terms of aliases or aggregate data (e.g., professional male, age 34, is currently reading Good to Great). The media site 108 might also provide recommendations to Bob Reader 122 based on media items being consumed or purchases being made by other users in the population 102 who exhibit similar media experiences. One example of the media experience page 126 is described below in more detail with reference to FIG. 5.

Exemplary System

Figure 2:
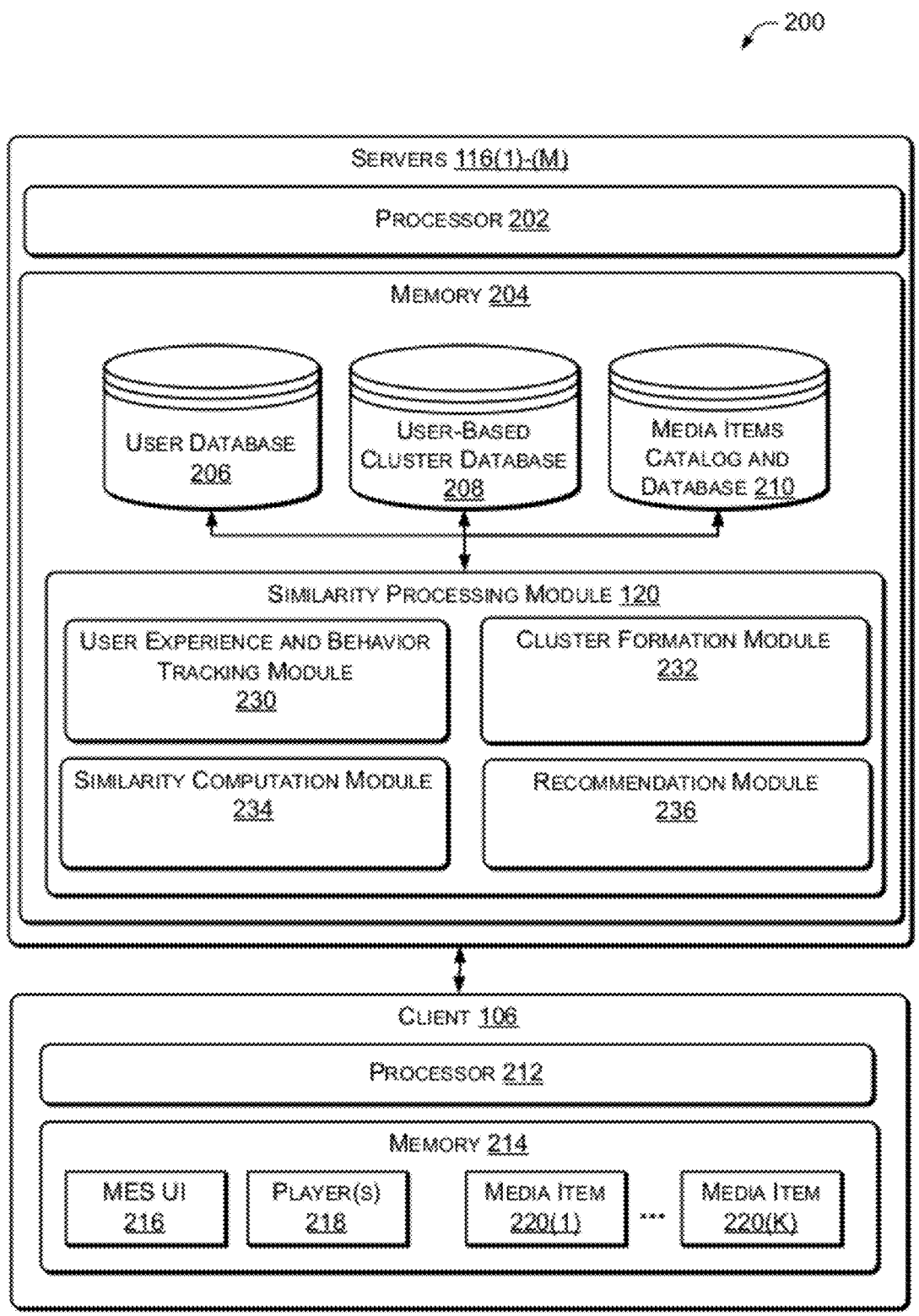
FIG. 2 is a block diagram illustrating selected modules in a computing system that implement discovery of media experience similarities among the users.

FIG. 2 shows selected modules in a representative computer system 200 that may be used to measure media experience similarities among a population of users and identify other users with similar experiences. The system 200 includes the servers 116(1)-(M) of the media site 108 and any of the client devices 106(1)-(N) or 126, as represented by a client 106. The servers 116(1)-(M) collectively provide processing capabilities 202 and memory 204. The memory 204 may include volatile and nonvolatile memory, removable and non-removable media implemented in any type or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Stored in the memory 204 are multiple databases, including a user database 206, a user-based cluster database 208, and a media items catalog and database 210. The customer database 206 maintains profiles of the users 104 in the population 102. User profiles may be established in response to users registering with the media site 108, subscribing to the site as part of a community, or simply visiting the site. The media items catalog and database 210 maintains a catalog of digital works, such as music, books, movies, and so on. Additionally, the database 210 may further include the works themselves that can be downloaded to the client 106. In this manner, when the client 106 accesses the servers 116(1)-(M), the user is able to browse the catalog for various media items, and then purchase and download that media item from the media items catalog and database 210. In other implementations, the servers may support the catalog, but facilitate delivery of the media items through other mechanisms.

The user-based cluster database 208 stores multiple user-based clusters that are formed based on media items consumed, or behaviors exhibited, by sample users. These sample users may be real users pulled from the user population 102, with profiles stored in the user database 206, or they may be fictitious users created to provide diverseness in the population group as to what people experience or how they behave. For instance, a collection of fictitious sample users may be formed as those who have experienced many different media items, yet without having any of the media items in common. In this manner, the clusters do not overlap or intersect with one another.

The client device 106 has a processor 212 and memory 214 (e.g., volatile, non-volatile, etc.). A media experience similarity user interface (MES UI) 216 is stored in the memory 214 and executed on the processor 212. The MES UI 216 provides information to the users pertaining to, and based on, media experience similarities among the population. In one implementation, the MES UI 216 is a browser or other application that renders pages or content served by the servers 116(1)-(M), such as the media experience page 126 of FIG. 1.

One or more players 218 are also stored at the client device 106 in memory 214. These players 218 enable the user to experience any of the media items 220(1), . . . , 220(K), which may be stored in memory 214 (as shown) or stored remotely. For instance, one type of player 218 may be an audio player to play music or other audio-based media items. Another type of player is a video player that enables playback of video or other video-based media items. Still another type of player is an eBook reader application that facilitates reading of a digital eBook or other text-based media items. The player may also be a multi-media player, allowing playback of multiple types of media items.

In the implementation of FIG. 2, the similarity processing module 120 resides in the memory 204 and executes on the processor 202. The module 120 functionally communicates with each of the databases 206-210. The similarity processing module 120 includes a user experience and behavior tracking module 230, a cluster formation module 232, a similarity computation module 234, and a recommendation module 236. The user experience and behavior tracking module 230 tracks which media items the users' experience, and other behaviors that may be of use in determining similarities. The tracking module 230 may access the user database 206 to learn which items the user has read, watched, listened to, or otherwise experienced. The tracking module 230 may also interface with the media item catalog and database 210 to discern users' browse activity at the media site 108, as well as any purchase decisions or other usage history. The tracking module 230 may conduct this discovery using user-blind techniques that allows the system 200 to identify this information without specifically attaching personal identities to the data. Data produced by the tracking module 230 may then be stored in the user database 206.

The cluster formation module 232 forms the user-based clusters maintained in database 208 based on media experience and/or other behaviors. In one implementation, the cluster formation module 232 selects sample users 104 from the user population 102 and communicates with the tracking module 230 to learn what media items the sample users have experienced and/or behavior they have exhibited. From this information, the cluster formation module 232 defines multiple user-based clusters. Before continuing with the description of the similarity computation module 234 and the recommendation module 236, one technique implemented by the cluster formation module 232 to form the user-based clusters is described with reference to FIG. 3.

Figure 3:
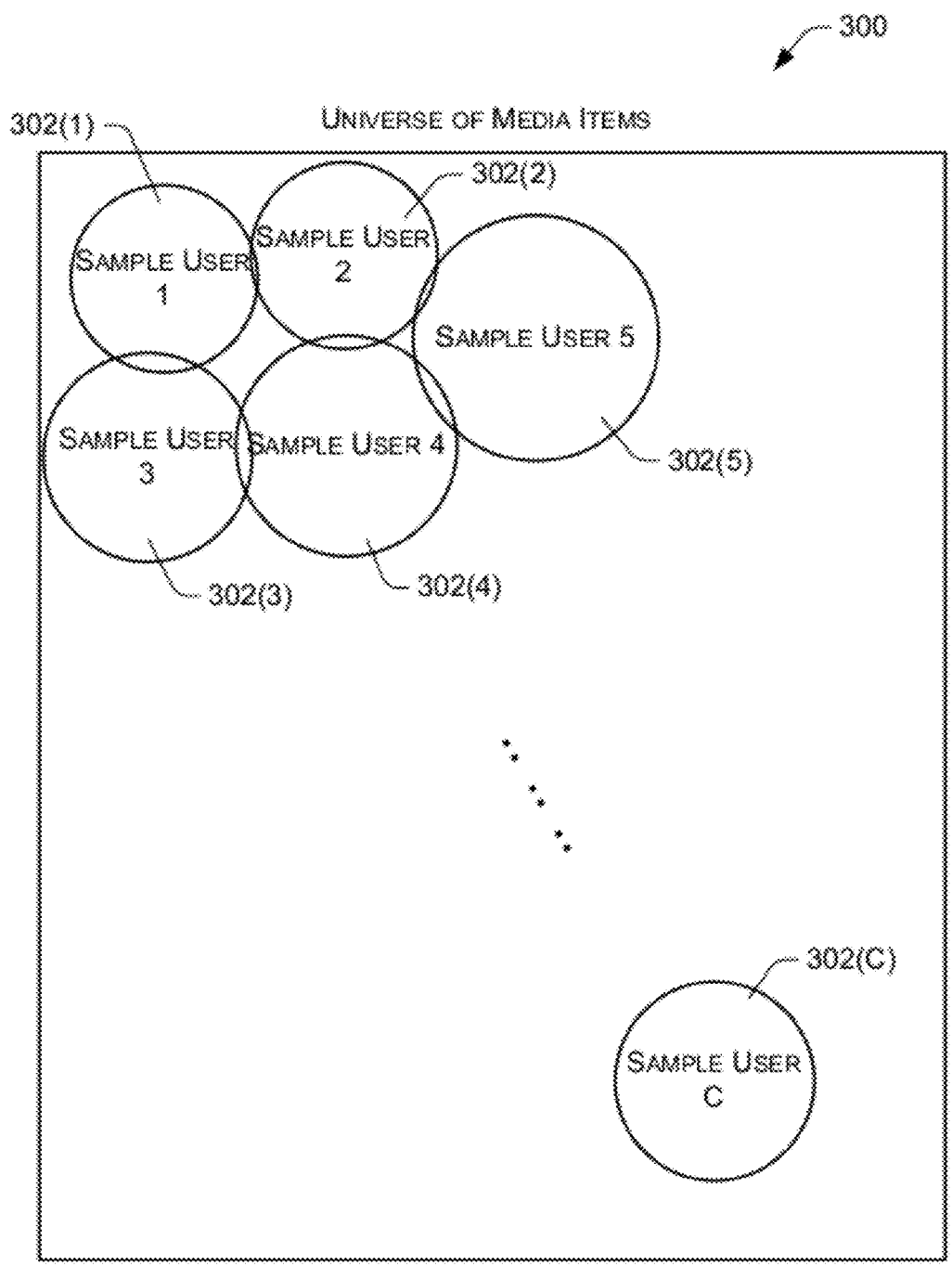
FIG. 3 shows a universe of media items, and clusters formed according to what media items sample users have experienced.

FIG. 3 shows one example approach to forming user-based clusters according to the media items experienced by the sample users. This approach may be extended to forming clusters based on other user behaviors, but for discussion purposes, will be described in the context of media items. Initially, a universe of media items 300 is established. The size of the universe 300 is variable depending upon implementation. In one implementation, for example, the item universe 300 encompasses the items presented in the catalog and/or contained in the database 210. Thus, as the client device 106 downloads or purchases various media items, that information is stored in the user database 206 and tracked by the tracking module 230. In another implementation, the item universe 300 may be the aggregate of media items 220(1)-(K) stored on the client devices 106(1)-(N) being used by the population 102.

It is further noted that the media items may be any type or format of content that the user reads, watches, listens to, or otherwise experiences. It may include digital media content such as electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multimedia content. The media items may also include non-digital, non-downloadable media content, such as paper books, magazines, analog movies, and so forth.

The cluster formation module 232 selects a first sample user from the population of users. The first sample user has experienced a first set of media items, such as books that she has read, movies that she has watched, and so forth. A first user-based cluster is defined to include the first set of media items experienced by the first sample user. In FIG. 3, the first user-based cluster for the first sample user is illustrated as a set 302(1), and is titled "Sample User 1".

Selection of the first sample user may be based on essentially any seed parameter. For instance, in one approach, the cluster formation module 232 establishes a threshold number of items (e.g., 200 media items) for all clusters, and then selects the first sample user as the user who has experienced the least number of media items that still exceeds the threshold. In another approach, the cluster formation module 232 selects the first user as the person in population 102 who has experienced the most media items. In yet another approach, the user who has experienced the widest variety of media items is chosen. Many other parameters may be used as a basis for selecting the first sample user. Further, as noted above, the sample user may be a fictional user who is assumed to have experienced a set of media items chosen mathematically.

After the first user-based cluster is formed, the cluster formation module 232 selects a second sample user from the population. The second sample user has also experienced a set of media items, and the second user-based cluster is defined according to that set of media items. In FIG. 3, the second user-based cluster is illustrated as a set 302(2), and is titled "Sample User 2".

The second sample user is chosen to be the next user who most closely adheres to the seed parameter (i.e., least number of media items above the threshold, most media items, widest variety, etc.) but who additionally meets a second criteria that his or her set of media items contains the most items not common with the set of media items of the first sample user. This is illustrated in FIG. 3 in that the two sets 302(1) and 302(2) barely, if at all, intersect or overlap. Another alternative way to measure the second criteria is finding the fewest common items among sets of media items.

The cluster formation module 232 continues to select sample users and define user-based clusters until there are no more sample users who meet the criteria of having experienced the threshold number of media items. The cluster for the last sample users is represented as set 302(C). The number of clusters C is thus variable, but a threshold should be chosen so that the number C is a positive integer greater than zero. It is noted that there may be on order of hundreds or thousands of clusters.

It is noted that each of the user-based clusters may be expanded during the cluster formation process to include other media items that represent essentially the same body of work, even though the sample user did not in fact experience the specific media items. For instance, the cluster may be expanded to include different translations of the same book, different editions of a book (e.g., limited edition, regular edition, etc.), and different imprints of the book (e.g., a book published in one country by one publisher name and released in a second country by another publisher name). Clusters may further be expanded based to include books in different release formats, such as rough cut hardback, soft cut hardback, and soft cover. Further, for other media items the clusters may be expanded to include slightly different arrangements of music (e.g., concert version of original recording), different formats of content (e.g., regular and high-definition versions of DVD movie, CD and tape, etc.), and so forth.

In another variation of the cluster formation process, once each cluster is formed, the media items in that cluster may be excluded from the universe before selecting the next sample user. For instance, with reference to FIG. 3, suppose that the set 302(1) of sample user 1 contains 203 media items (i.e., three items above an example threshold level of 200 media items). Before selecting the next sample user, the 203 media items are removed from the item universe 300 and the cluster formation module 232 selects the next user who most closely adheres to the seed parameter (i.e., least number of media items above the threshold, most media items, widest variety, etc.) for the smaller item universe.

With reference again to FIG. 2, the similarity processing module 120 has a similarity computation module 234 to derive a media experience similarity between any two users in the population 102 who were not chosen to be sample users. The similarity computation module 234 computes how each of the non-sample users compares to the user-based clusters 302(1), 302(1), . . . , 302(C).

In one approach, the similarity computation module 234 maps the user-based clusters as orthogonal vectors in a multi-dimensional space. This process is shown in FIG. 4.

Figure 4:
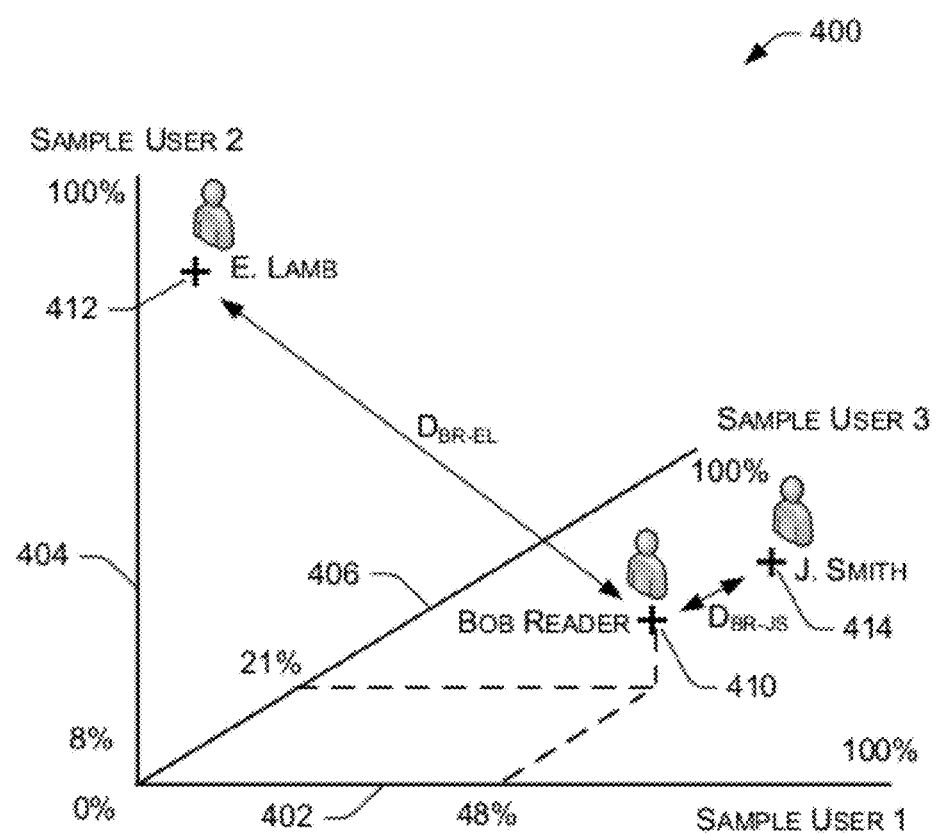
FIG. 4 is a multi-dimensional space having the user-based clusters formed in FIG. 3 mapped as orthogonal vectors therein.

FIG. 4 shows a representation of a multi-dimensional space 400 in which three user-based clusters for sample users 1, 2, and 3 are mapped along three dimensions. More specifically, the user-based cluster 302(1) for sample user 1 is mapped as an x-axis 402; the user-based cluster 302(2) for sample user 2 is mapped as a y-axis 404; and the user-based cluster 302(3) for sample user 3 is mapped as a z-axis 406. All three axes 402-406 are orthogonal to one another in the space 400. Furthermore, although not illustrated, the multi-dimensional space 400 theoretically can contain C user-based clusters mapped to C orthogonal axes in the space 400, where C is any positive integer greater than three. A model of this space is maintained in the user-based cluster database 208 and/or by the similarity computation module 234.

It is noted that the formation of user-based clusters and the mapping of those clusters to the space 400 may be performed prior to computing any similarities among the users. Some of these operations are mathematical intensive, and hence are conducted in advance, rather than in substantial real-time in response, for example, to when a user first visits the media site. Once the clusters and space 400 are defined, however, the similarity computation module 234 can compute media experience similarity metrics among any two or more users in the population in substantially real-time.

In the continuing example, the similarity computation module 234 places each non-sample user into the multi-dimensional space 400 according to how the media items experienced by each non-sample user compares with the media items in each of the user-based clusters mapped along the orthogonal vectors. As part of the placing of the non-sample user into the space 400, the similarity computation module 234 may further normalize the relation of the user to the user-based clusters.

As an example, suppose that the similarity computation module 234 is computing similarities between Bob Reader 122 and all other users in the population 102. As illustrated in FIG. 4, the similarity computation module 234 initially places or maps Bob Reader 122 to the multi-dimensional space 400 according to degrees of similarity between Bob Reader's media experiences (as maintained in a profile in the user database 206) and each of the user-based clusters defined along the orthogonal vectors 402-406. Here, Bob Reader 122 has experienced about half of the same books, movies, music, and other media items as Sample User 1 along the x-axis 402, as represented by the 48% mark along the axis 402. Bob Reader 122 has also experienced about one-tenth of the same books, movies, music, and other media items as Sample User 2 along the y-axis 404 and one-fifth of the same books, movies, music, and other media items as Sample User 3 along the z-axis 406. Thus, a point 410 in the space 400 is assigned to Bob Reader 122 to represent his media experience similarities with the sample users as captured by their user-based clusters.

The similarity computation module 234 repeats this process for all other non-sample users in the population 102, defining respective points in the multi-dimensional space 400 according to degrees of similarity between the non-sample users' media experiences and each of the user-based clusters defined along the orthogonal vectors. In this illustration, two other non-sample users are depicted: "E. Lamb" at point 412 and "J. Smith" at point 414. "E. Lamb" has had similar media experiences as Sample User 2, and less similarity with Sample Users 1 and 3. In the same way, "J. Smith" has had more similar experiences as compared to Sample User 3 and some similar experiences as compared with Sample User 1 and less similarity as compared to Sample User 2.

To determine similarity between any two non-sample users in the population 102, the similarity computation module 234 computes a similarity metric as a function of the distance between the two non-sample users in the multi-dimensional space 400. In this example, a first distance $D_{BR-EL}$ is computed between the Bob Reader point 410 and the E. Lamb point 412. A second distance $D_{BR-JS}$ is computed between the Bob Reader point 410 and the J. Smith point 414. As visually observed, the distance $D_{BR-EL}$ between Bob Reader and E. Lamb is greater than the distance $D_{BR-JS}$ between Bob Reader and J. Smith. Thus, Bob Reader is said to be more similar to J. Smith, than E. Lamb, with respect to the media items that they have all experienced. Said another way, Bob Reader and J. Smith have had more similar media experiences, whereas Bob Reader and E. Lamb have had less similar (or even dissimilar) media experiences.

The distances can be expressed in several ways to provide similarity metrics between the target user (e.g., Bob Reader) and all other non-sample users in the population. The users can then be ranked or organized according to similarity metrics. This allows a user like Bob Reader to identify other users in the population in different ways, such as from most similar to least similar, or the top ten most similar users, or the 10% least similar users, and so forth. If other people post or expose those media items that they are currently experiencing, then Bob Reader is able to identify media items of interest by identifying other users with similar media experiences and reviewing what selections they are currently making.

With reference again to FIG. 2, the similarity processing module 120 also includes a recommendation module 236 that generates recommendations for other media items, which may be of interest to a user, according to the media experience similarity metrics computed by the similarity computation module 234. For instance, the recommendation module 236 may track media items being experienced by J. Smith, and from time-to-time compare those media items with those being experienced by Bob Reader. If there are certain items that Bob Reader appears not to be aware of, the recommendation module 236 can recommend these media items to Bob Reader as being media items that another person (i.e., J. Smith) with similar experiences has recently consumed. The recommendations may be made in any number of ways, including as part of the media experience pages 126, via email, or other modes.

Example User Interface

Figure 5:
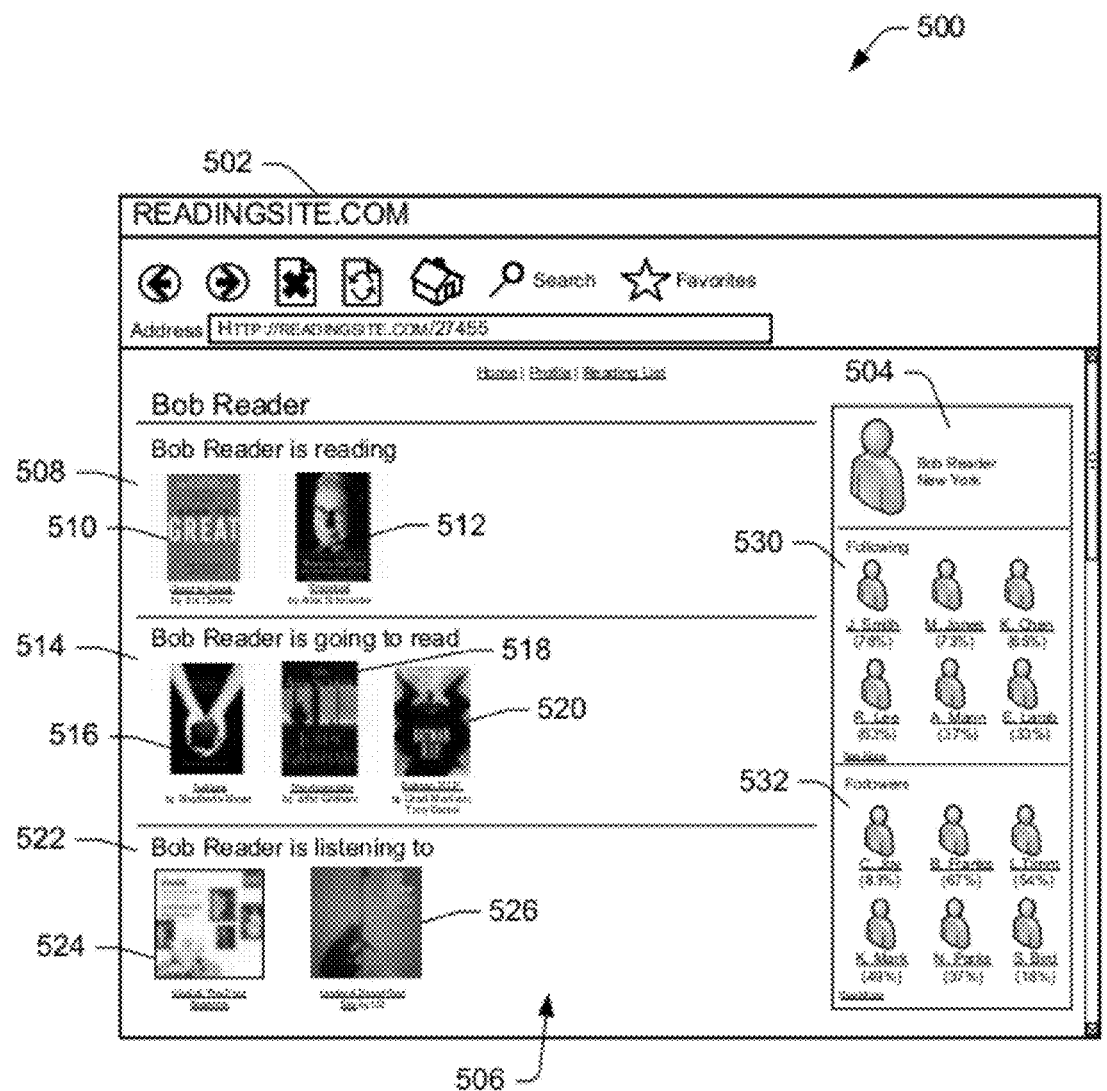
FIG. 5 illustrates a screen rendering of an exemplary user interface directed to media experiences of a user.
Figure 6:
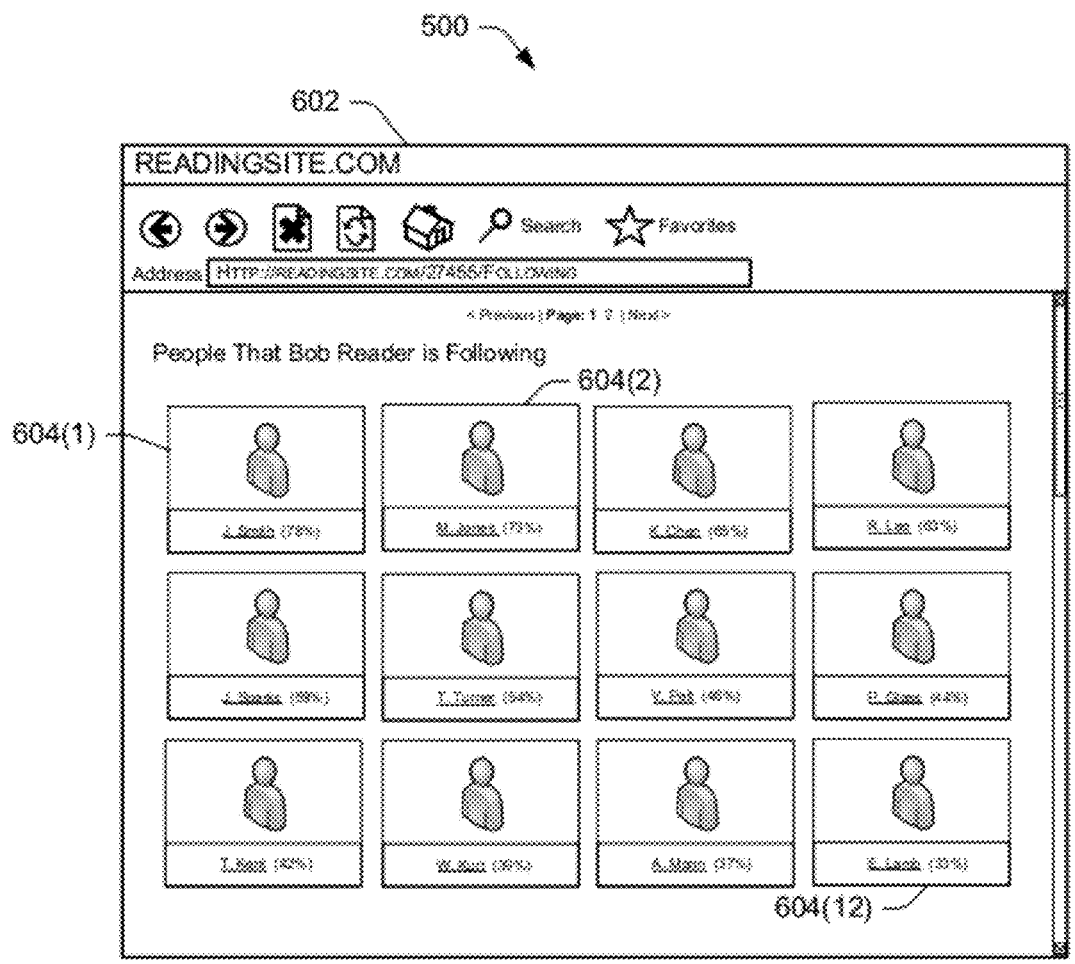
FIG. 6 illustrates a screen rendering of an exemplary user interface for identifying other people and corresponding media experience similarity metrics relative to the user.
Figure 7:
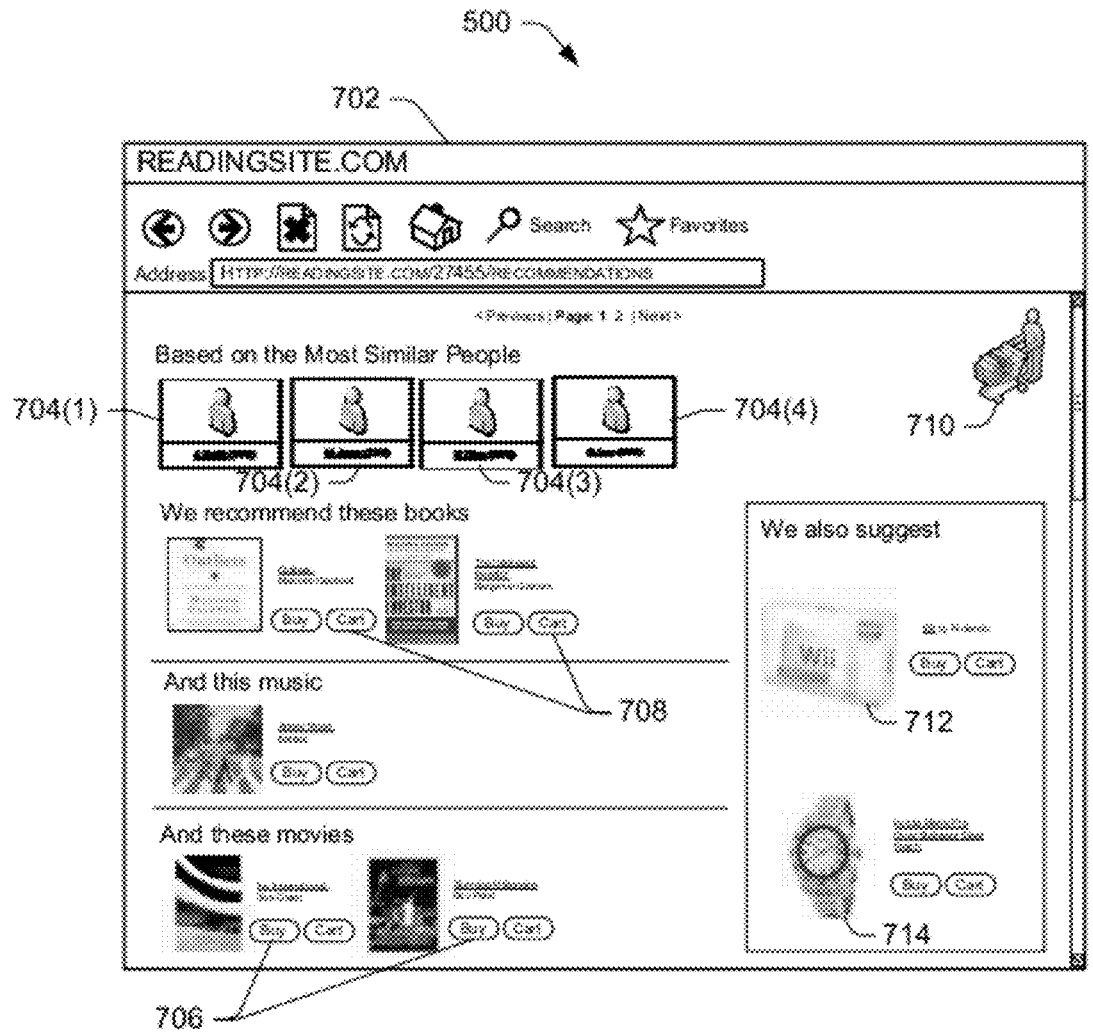
FIG. 7 illustrates a screen rendering of an exemplary user interface for recommending media items based on the media experience similarity metrics.

FIGS. 5-7 show a series of screen renderings of an exemplary user interface 500 that provides information based on media experience similarities among users. In this example series, the screen renderings are illustrated as web pages rendered within a browser. However, this is merely one possible implementation, and other technologies may be employed to facilitate electronic user entry of questions.

FIG. 5 shows a first screen rendering 502 of the UI 500, which is an enlarged version of the media experience page 126 from FIG. 1. The UI 500 provides customized interfaces for individual users in the population. Here, the UI 500 provides a media experience page 502 for Bob Reader, one of the many people in the user population 102. An identity area 504 is provided with an image of Bob Reader (if one exits) and his residence or other address.

The UI 500 includes several areas arranged for simultaneous presentation to the user. A first area 506 is established to allow the user, Bob Reader, to identify which media items are currently of interest. In this graphical layout, the reader interest area 506 is separated into three demarcated zones. A first or top zone 508 allows Bob Reader to indicate which books he is currently reading, such as *Good to Great* by Jim Collins as represented by a thumbnail 510 and *Snowball* by Alice Schroeder as represented by a thumbnail 512. A second or middle zone 514 provides a location for Bob Reader to indicate which books is about read, such as *Twilight* by Stephanie Meyer (thumbnail 516), *The Associate* by John Grisham (thumbnail 518), and *Batman R.I.P.* but Grant Morrison and Tony Daniel (thumbnail 520). A third or lower zone 522 allows Bob Reader to identify which music items he is listening to, such as Vivaldi: the Four Seasons (thumbnail 524) and U2's Under the Blood Red Sky (thumbnail 526).

It is noted that the first area 504 may be segmented into more or less than three zones. Further, the zones may be of any shape. Moreover, the content of each zone is merely representative. In other implementations, the zones may further include any number of things, such as media items that Bob Reader intends to purchase, media items that Bob Reader does not like, media items that Bob Reader recommends or cautions against, and so forth.

A second area 530 of the UI 500 is provided to list a first set of non-sample users who Bob Reader chooses to track selection of media items. In this example, Bob has selected at least six people to follow: "J. Smith", "M. Jones", "K. Chen", "R. Lee", "A. Mann", and "E. Lamb." The users are arranged in the area 530 according to their media experience similarity metrics in relation to Bob Reader. In this illustration, the metric is given as a percentage, with a higher percentage representing closer similarity in media experiences and a lower percentage representing less similarity. Here, the users are ranked and visually organized according to the metric. Thus, "J. Smith", with the highest similarity metric of 78% in the group, is ordered first and "E. Lamb" is last.

A third area 532 of the UI 500 lists a second set of users who have chosen to track selections of media items made by Bob Reader. This second set of users can also be arranged according to the media experience similarity metrics.

Each user in the areas 530 and 532 are active links that, upon selection by Bob Reader, retrieve the media experience profile of the selected user. The profile reveals what items the user is currently experiencing and other information. Further, the areas 530 and 532 may be expanded to show more users that Bob Reader may be following or who are following him.

FIG. 6 shows another screen rendering 602 of the UI 500 that is presented in response to Bob Reader expanding the list of people he is following. Several users are identified in individual tiles 604(1), 604(2), . . . , 604(12). Each tile 604(1)-(12) has an image (if available) or thumbnail representation of the user, as well as their name or alias. Additionally, each tile shows the media experience similarity metric. The tiles are arranged from highest similarity metric ("J. Smith" at 78%) to lowest similarity metric ("E. Lamb" at 33%).

The people identified in this list may be selected in various ways. In one implementation, Bob Reader specifically identifies and adds those people he wishes to follow. In another implementation, the similarity processing module 120 suggests people that Bob may be interested in following based on similarity metrics. For instance, the similarity processing module 120 may suggest the people who are most similar. As another example, the module 120 may suggest people who are very dissimilar, but read the same last three books as Bob Reader.

FIG. 7 shows another screen rendering 702 of the UI 500 that recommends media items to Bob Reader. The recommendation module 236 (FIG. 2) selects media items which have been, or are being, experienced by other people who have had similar media experiences. In this recommendations page

702, recommendations are derived from the interests of others who are most similar. In this example, four people are considered for possible recommendations to Bob Reader, as represented by tiles 704(1)-(4). The recommendations module 236 queries the user database 206 to ascertain what media items the set of users identified by tiles 704(1)-(4) are presently, or have in the past, experienced. The recommendation module 236 learns, for example, what books are being read by J. Smith in tile 704(1) (similarity metric of 78%), and what movies she has watched and what music is of interest. After doing this for each user in the set, the recommendation module 236 compares that collection of candidate media items with the media items already experienced by Bob Reader to determine if there are any items that might be new to Bob Reader.

In the illustrated example, the recommendation module 236 suggests two books (i.e., *Outliers* by Malcolm Gladwell and *The Intelligent Investor* by Benjamin Graham), a music selection (i.e., Abbey Road by The Beatles), and two movies (i.e., The International and Slumdog Millionaire). The recommendations page 702 also provides the user (i.e., Bob Reader) with the opportunity to purchase any one of these media items via a "Buy" control 706 associated with each item, or to add these to a shopping cart for later purchase via a "Cart" control 708. The shopping cart may be accessed at any time by actuating a cart control 710.

In addition to media items, the recommendation module 236 may recommend other goods and services based on purchases made, or behaviors exhibited, by the people in the recommendation set 704(1)-(4). In the illustrated example, the recommendations page 702 also includes a recommendation to consider a Wii® brand game console from Nintendo Corp., as represented by a thumbnail image 712, and a watch, as represented by a thumbnail image 714. Associated with these non-media items are controls to buy or add to the shopping cart.

Operation

Figure 8:
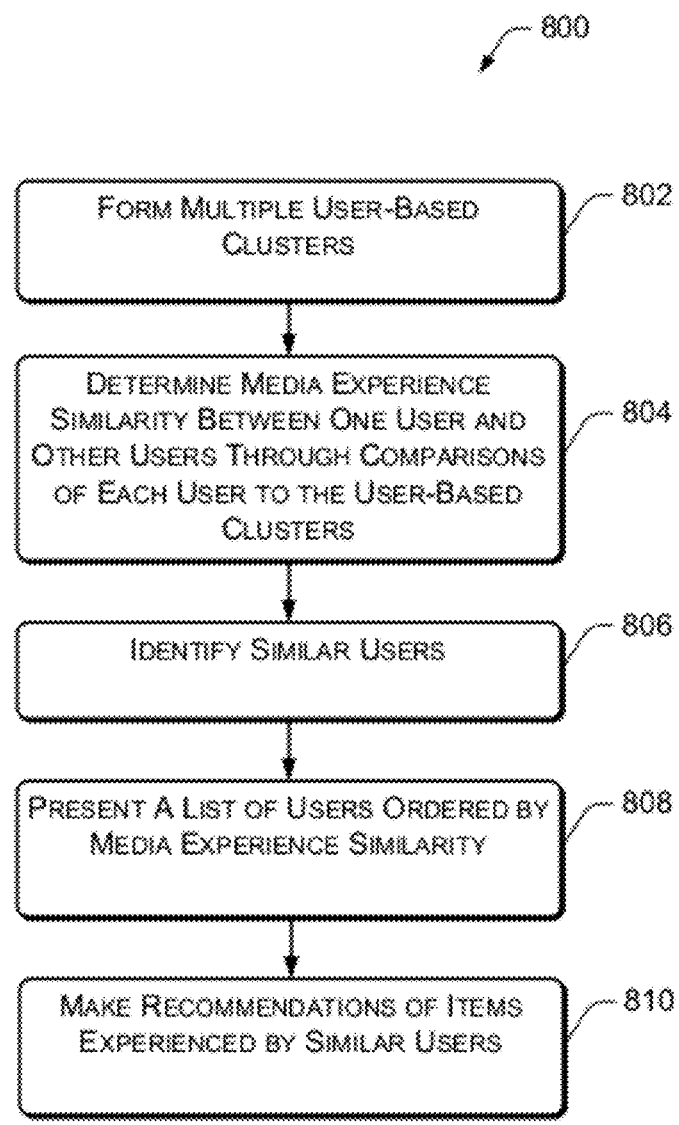
FIG. 8 is a flow diagram of an example process of identifying users with similar media experiences, and recommending other media items based thereon.

FIG. 8 shows a general process 800 of identifying users with similar media experiences, and recommending media items being experienced by these other users. The process 800 (as well as processes 900 and 1000 in FIGS. 9 and 10) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the process 800 (as well as processes 900 and 1000 below) is described with reference to the architecture 100 of FIG. 1 and the computing system 200 of FIG. 2. Additional reference may be made to any of the UI renderings in FIGS. 5-7.

At 802, multiple user-based clusters are formed according to the media items consumed by sample users. With reference to the architecture 100 of FIG. 1, for example, certain people in the population 102 are selected as sample users from whom the user-based clusters are derived based on the media items the sample users have experienced. In another implementation, the sample users may be fictitious, and computed to optimize the diverseness of media items. The cluster formation module 232 (FIG. 2) forms the user-based clusters upon which to measure similarities among the users. One possible technique for forming the user-based clusters is described above with reference to FIG. 3. Moreover, a more detailed process is described below with reference to FIG. 9.

At 804, media experience similarities are determined between a first non-sample user (e.g., Bob Reader) and one or more other non-sample users. The media experience similarity is computed in part by comparing each of the non-sample users to the user-based clusters formed at 802. As described above with reference to FIG. 4, one approach to computing media experience similarities begins with arranging the user-based clusters as orthogonal vectors in a multi-dimensional space 400. Then, the non-sample users are mapped into a multi-dimensional space according to how the media items experienced by each of the non-sample users compares with the media items in each of the user-based clusters. This results in the placement of points in the space 400, such as points 410-414, which represent the non-sample users. The similarity computation module 234 computes a distance between these points within the multi-dimensional space. This distance serves as a metric to define how similar or dissimilar any two users are to one another.

At 806, other users in a user population with similar media experiences are identified. For instance, as shown in FIG. 4, the similarity computation module 234 is able to identify that J. Smith has had similar media experiences as compared with Bob Reader (comparatively close in distance), whereas E. Lamb has not had similar media experiences (comparatively far in distance).

At 808, a list of other users are presented and arranged according to media experience similarity. The ordering may be from most similar to least similar, vice versa, or some other arrangement based on the similarity metrics. FIG. 6 shows one example UI rendering in which other users are presented in order according to the similarity metric computed between those users and the subject user (i.e., Bob Reader).

At 810, recommendations are made to the user of other media items being experienced by the similar users identified in 806. In one implementation, the recommendation module 236 ascertains which media items were experienced by other similar users, cross checks those items with those experienced by the user, and recommends any items that do not appear to have been experienced by the user. FIG. 7 shows an example recommendations page 702 that offers new media items to Bob Reader that may be of interest to him.

Figure 9:
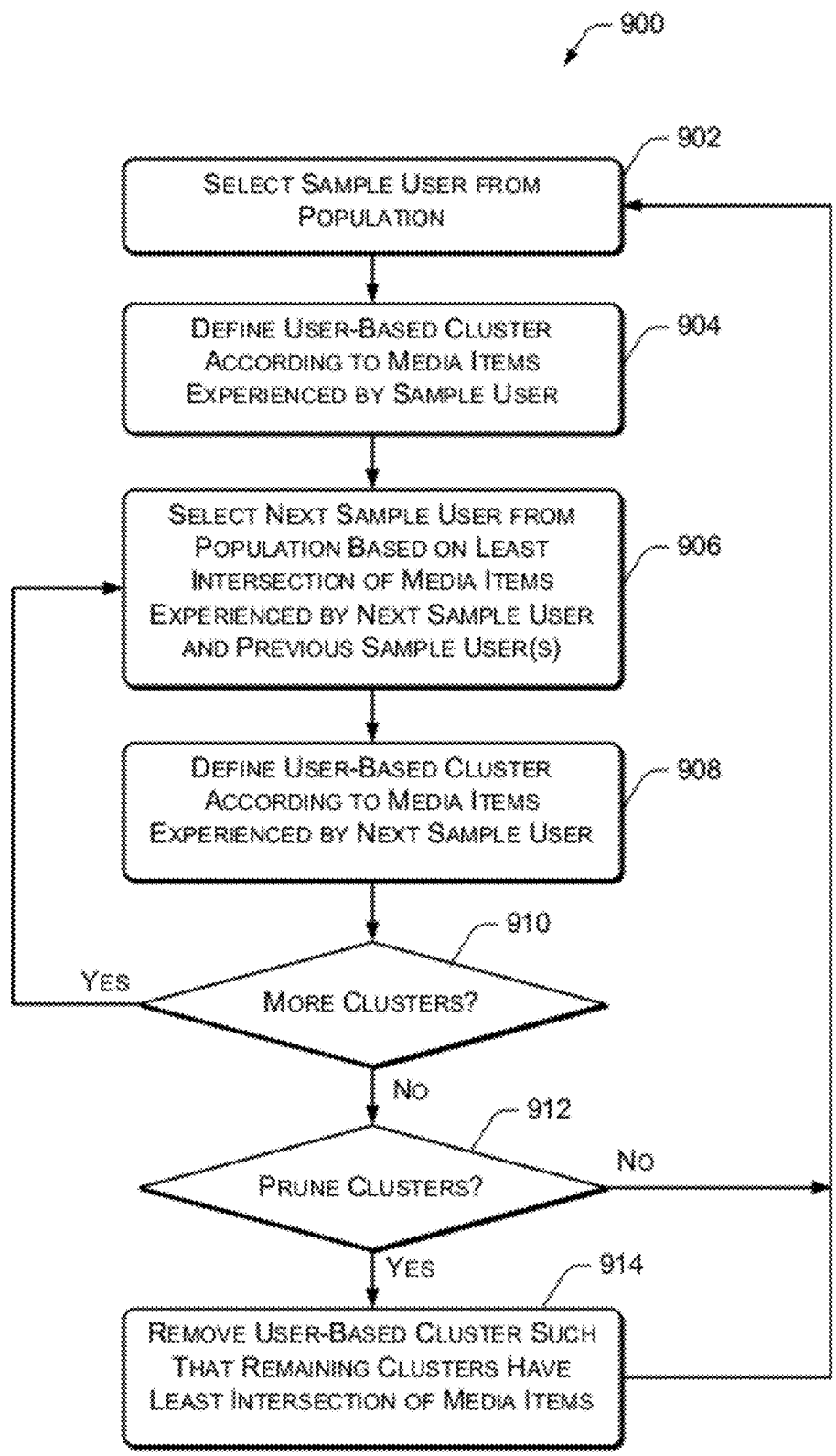
FIG. 9 is a flow diagram of an exemplary process of creating user-based clusters for determination of media experience similarities.

FIG. 9 shows an exemplary process 900 of creating user-based clusters for determination of media experience similarities. The process 900 is one possible implementation of act 802 in the process 800 of FIG. 8. The process 900 is described below with reference to FIG. 3.

At 902, a sample user is selected from the population. As noted above, the sample user may be a real user or a fictitious user. In one implementation, the first sample user to be selected is the user who has experienced the most media items. As shown in FIG. 3, the first sample user has the largest collection of media items, as represented by the largest circle 302(1).

At 904, the first user-based cluster is formed according to a set of media items experienced by the first sample user. That is, the cluster is defined as the media items (e.g., books, movies, music, etc.) that the first sample user has consumed.

At 906, another sample user is selected. In one implementation, the next sample user is selected to satisfy dual conditions of (1) being the user with the next largest collection of media items such that (2) the collection of media items overlaps least with the set of media items experienced by the first sample user. This is illustrated in FIG. 3 in that the second sample user has the next largest circle 302(2) and it intersects least with the cluster set 302(1). That is, there are few, if any, media items contained in both the first and second sets 302(1) and 302(2).

At 908, the next user-based cluster is formed according to a set of media items experienced by the next sample user.

At 910, the process determines whether more clusters are desired. The number of clusters is a configurable input, depending upon the implementation environment. If more clusters are desired (i.e., the "Yes" branch from 910), selection of a next sample user is performed at 906.

If no additional clusters is desired (i.e., the "No" branch from 910), the process further determines whether to prune any clusters at 912. Some clusters may over time prove less effective at distinguishing among user similarities. For instance, over time, the media items experienced by two sample users may become generally the same, and hence two clusters do not effectively differentiate users. If no clusters should be pruned (i.e., the "No" branch from 912), the process returns to 910 for a determination of whether more clusters are desired. On the other hand, if certain clusters should be pruned (i.e., the "Yes" branch from 912), one or more clusters are removed at 914. Selection of the clusters for pruning is made to achieve the dual goal of having the largest sets of media items that have the least intersection among the sets. Once the pruning is performed, the process 900 returns to 902.

Figure 10:
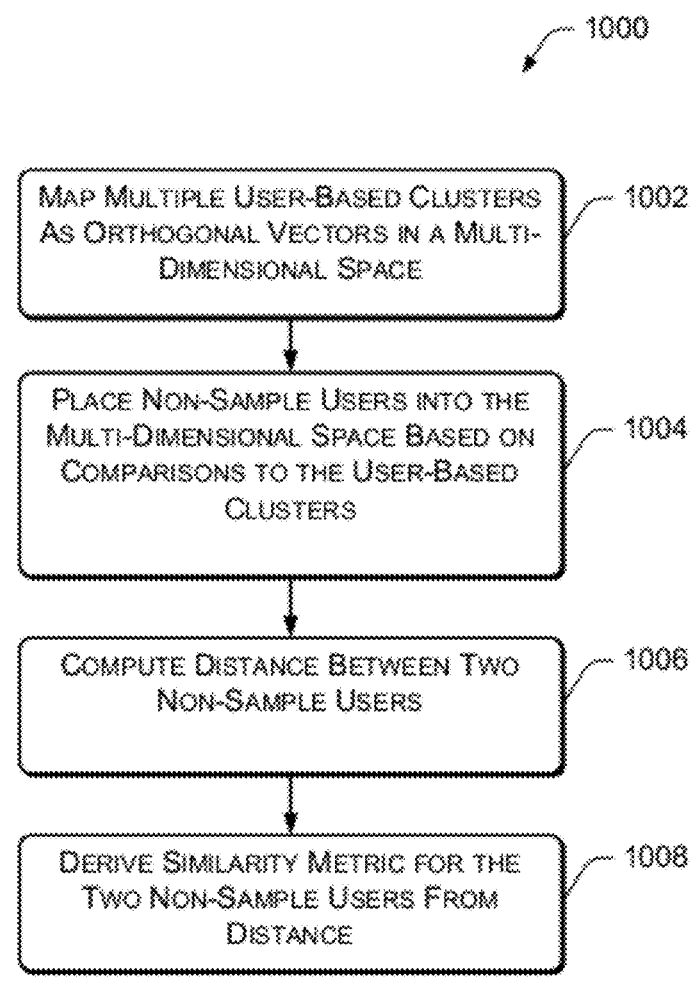
FIG. 10 is a flow diagram of an exemplary process of computing a similarity metric based on the user-based clusters formed in FIG. 9.

FIG. 10 shows an exemplary process 1000 of computing a similarity metric based on the user-based clusters formed in the process 900 of FIG. 9. The process 1000 is one example implementation of act 804 in the process 800 of FIG. 8. The process 1000 is described below with reference to FIG. 4.

At 1002, the user-based clusters formed in process 900 are mapped into orthogonal vectors in a multi-dimensional space. Three example user-based clusters are shown mapped along three orthogonal axes 402-406 of space 400 in FIG. 4.

At 1004, non-sample users are placed into a multi-dimensional space according to degrees of similarity between each non-sample user and each of the user-based clusters. More specifically, the user's collection of media items is compared to the sets of media items defined by each of the user-based clusters. The non-sample user has a higher degree of similarity to the user-based cluster if there exists more common media items, and a less degree of similarity if there exists few common media items.

At 1006, a distance is computed between any two non-sample users in the three dimensional space. As shown in FIG. 4, a distance $D_{BR-JS}$ measures the distance between Bob Reader and J. Smith, and a distance $D_{BR-EL}$ separates Bob Reader from E. Lamb.

At 1008, a similarity metric explaining the relationship between two non-sample users is derived from the distances. In one implementation, the distance calculation is converted to a percentage value ranging from 0% to 100%. Two non-sample users are said to have similar media experiences as the percentage value approaches 100%, and less similar media experiences as the percentage value approaches 0%.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   forming multiple individual user-based clusters according to media items experienced by individual sample users on whom each of the clusters are based; and
   computationally deriving a media experience similarity between a first non-sample user and a second non-sample user with respect to the media items the first and second non-sample users have experienced, the media experience similarity being derived in part based on a comparison of a first indicator and a second indicator, the first indicator indicative of how similar a media experience of the first non-sample user is to a media experience associated with the multiple individual user-based clusters and the second indicator indicative of how similar a media experience of the second non-sample user is to a media experience associated with the multiple individual user-based clusters.

2. The computer-implemented method of claim 1, wherein the media items comprise at least one of text, images, audio, and video.

3. The computer-implemented method of claim 1, wherein the sample users are real humans.

4. The computer-implemented method of claim 1, wherein the sample users are fictitious users computed to provide diversity.

5. The computer-implemented method of claim 1, wherein the media items comprise books, and the media experience similarity comprises a reading similarity with respect to the books that the first and second non-sample users have read.

6. The computer-implemented method of claim 1, wherein the forming of the multiple individual user-based clusters comprises:
   selecting a first sample user;
   defining a first individual user-based cluster according to a first set of media items experienced by the first sample user;
   selecting a second sample user to satisfy a condition that a second set of media items experienced by the second sample user contains the most items not common with the first set of media items experienced by the first sample user; and
   defining a second individual user-based cluster according to the second set of media items experienced by the second sample user.

7. The computer-implemented method of claim 6, further comprising expanding the first and second user-based clusters to include other media items that represent variations of a same body of work as the media items experienced by the first and second sample users.

8. The computer-implemented method of claim 6, wherein the selecting of the first sample user comprises choosing a sample user, from among a population of users, who has experienced a least number of media items that still exceeds a threshold number of media items.

9. The computer-implemented method of claim 6, wherein the selecting of the first sample user comprises choosing a sample user, from among a population of users, who has experienced the most media items.

10. The computer-implemented method of claim 6, further comprising repeating the selecting and defining for C sample users, where C is a positive integer greater than zero.

11. The computer-implemented method of claim 1, further comprising pruning certain ones of the multiple user-based clusters.

12. The computer-implemented method of claim 1, wherein
- the first and second indicators are determined by mapping the first and second non-sample users into a multi-dimensional space according to how the media items experienced by each of the first and second non-sample users compares with the media items in each of the user-based clusters; and
- the comparison of the first and second indicators comprises at least computing a distance from the first non-sample user to the second non-sample user within the multi-dimensional space.

13. The computer-implemented method of claim 1, further comprising identifying one or more other non-sample users who have one of a highest or lowest media experience similarity as compared to the first non-sample user.

14. The computer-implemented method of claim 13, further comprising presenting, on a user interface, a list of the other non-sample users.

15. The computer-implemented method of claim 13, further comprising recommending media items to the first non-sample user, wherein the media items are selected from a set of the media items consumed by the other non-sample users who have higher media experience similarities.

16. A computer-implemented method, comprising:
- forming multiple individual clusters of items experienced by sample users; and
- computationally deriving an experience similarity between a first non-sample user and a second non-sample user with respect to a first cluster of items and a second cluster of items experienced by the first and second non-sample users, respectively, the experience similarity being derived in part based on a comparison of a first indicator and a second indicator, the first indicator indicative of how similar the first cluster of items is to the multiple individual clusters of items experienced by sample users and the second indicator indicative of how similar the second cluster of items is to the multiple individual clusters of items experienced by sample users.

17. The computer-implemented method of claim 16, wherein the items comprise media items.

18. The computer-implemented method of claim 16, wherein
- the first and second indicators are determined by mapping the first and second non-sample users into a multi-dimensional space according to how the items experienced by each of the first and second non-sample users compares with the items in each of the individual clusters; and
- the comparison of the first and second indicators comprises at least computing a distance from the first non-sample user to the second non-sample user within the multi-dimensional space.

19. A computer-implemented method, comprising:
- under control of a computing device configured with executable instructions, performing the following:
- selecting, from a population of users, a first sample user who experiences a first set of media items;
- defining a first individual user-based cluster according to the first set of media items experienced by the first sample user;
- selecting, from the population of users, a second sample user who experiences a second set of media items;
- defining a second individual user-based cluster according to the second set of media items experienced by the second sample user; and
- repeating the selecting and defining to form C individual user-based clusters, where C is a positive integer greater than two; and
- under control of a computing device configured with executable instructions, performing the following in substantially real time:
- receiving a query from a non-sample user; and
- determining a media experience similarity between the non-sample user and one or more other non-sample users with respect to the media items the non-sample users have experienced, the media experience similarity between the non-sample user and each of the other non-sample users being derived in part based on a comparison of a first indicator and a second indicator, the first indicator indicative of how similar a media experience of the non-sample user is to a media experience associated with each of the individual user-based clusters and the second indicator indicative of how similar a media experience of the other non-sample user is to a media experience associated with each of individual user-based cluster.

20. The computer-implemented method of claim 19, wherein the selecting a first sample user comprises selecting a first sample user who has experienced a least number of media items that still exceeds a threshold number of media items.

21. The computer-implemented method of claim 20, wherein the selecting a second sample user comprises selecting a second sample user who has experienced a next least number of media items that still exceeds the threshold number and additionally meets a criteria that the second set of media items contains most items not common with the first set the media items.

22. The computer-implemented method of claim 21, further comprising excluding media items in the first set of media items from a universe of media items to form a smaller universe of media items before selecting the second sample user, wherein the selecting of the second sample user comprises selecting a second sample user who has experienced a least number of media items in the smaller universe that still exceeds a threshold number of media items.

23. The computer-implemented method of claim 19, further comprising suggesting non-sample users of interest based on the media experience similarity.

24. The computer-implemented method of claim 19, further comprising recommending media items that are experienced by other non-sample users who are determined to have similar media experiences.

25. A non-transitory computer-readable media storing computer-readable instructions that, when executed, instruct a processor to perform acts comprising:
- forming multiple individual user-based clusters according to behaviors exhibited by individual sample users on whom each of the clusters are based;
- mapping the user-based clusters as orthogonal vectors in a multi\-dimensional space;
- placing a first non-sample user into the multi-dimensional space according to how the media items experienced by the first non-sample user compares with the media items in each of the individual user-based clusters;
- placing a second non-sample user into the multi-dimensional space according to how the media items experienced by the second non-sample user compares with the media items in each of the individual user-based clusters; and computing a similarity metric between the first and second non-sample users as a function of a distance from the first non-sample user to the second non-sample user within the multi-dimensional space.

26. The non-transitory computer-readable media of claim 25, wherein the behaviors comprise at least one of purchase decisions, browsing behavior, media items experienced, and usage history.

27. The non-transitory computer-readable media of claim 25, wherein the forming multiple user-based clusters comprises:

selecting a first sample user who exhibits a first set of behaviors;

defining a first individual user-based cluster according to the first set of behaviors;

selecting a second sample user who exhibits a second set of behaviors, the second sample user being selected to satisfy a condition that the second set of behaviors intersect least with the first set of behaviors; and defining a second individual user-based cluster according to the second set of behaviors.

28. The non-transitory computer-readable media of claim 27, wherein the forming multiple individual user-based clusters further comprises repeating the selecting and defining for C sample users, where C is a positive integer greater than two.

29. The non-transitory computer-readable media of claim 25, further comprising pruning certain ones of the multiple individual user-based clusters.

30. The non-transitory computer-readable media of claim 25, further comprising ranking non-sample users relative to the first non-sample user according to similarity metrics.

31. The non-transitory computer-readable media of claim 25, further comprising presenting, via a user interface, a list of non-sample users relative to the first non-sample user and ordering the list according to similarity metrics.

32. The non-transitory computer-readable media of claim 25, further comprising presenting, via a user interface, a list of non-sample users relative to the first non-sample user and enabling the first non-sample user to elect to follow one or more of the non-sample users with respect to the behaviors exhibited.

33. The non-transitory computer-readable media of claim 25, further comprising making recommendations to the first non-sample user based on behaviors observed of one or more other non-sample users with relatively high similarity metrics.

* * * * *